Oct. 3, 1939.  R. N. FRANK  2,174,824
PORTABLE COOKER
Filed Feb. 25, 1939
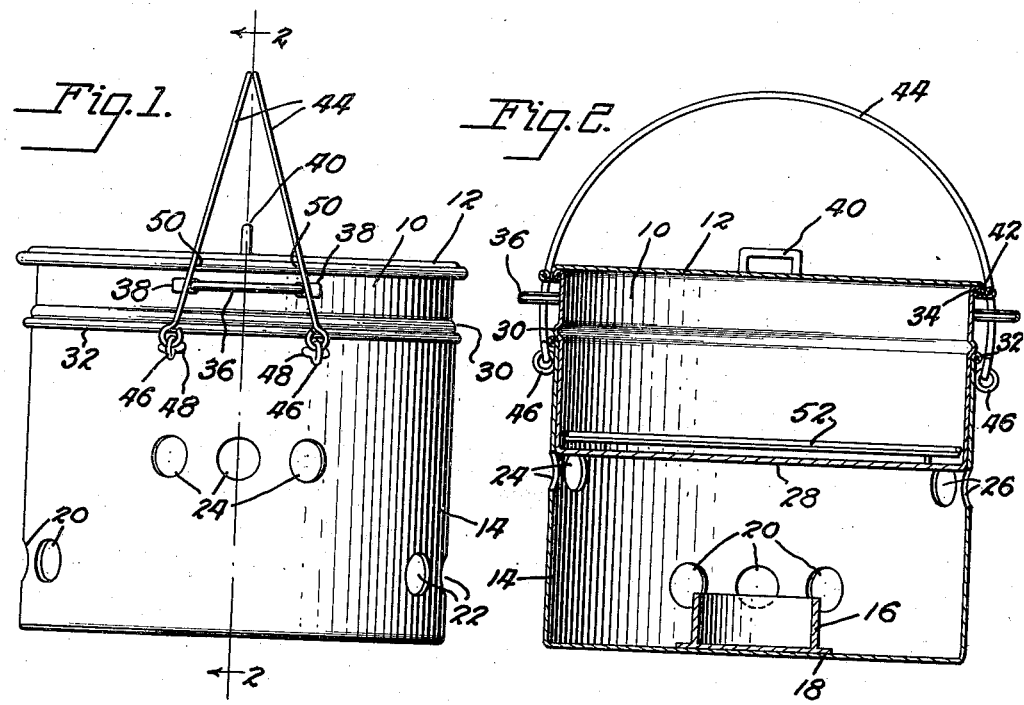
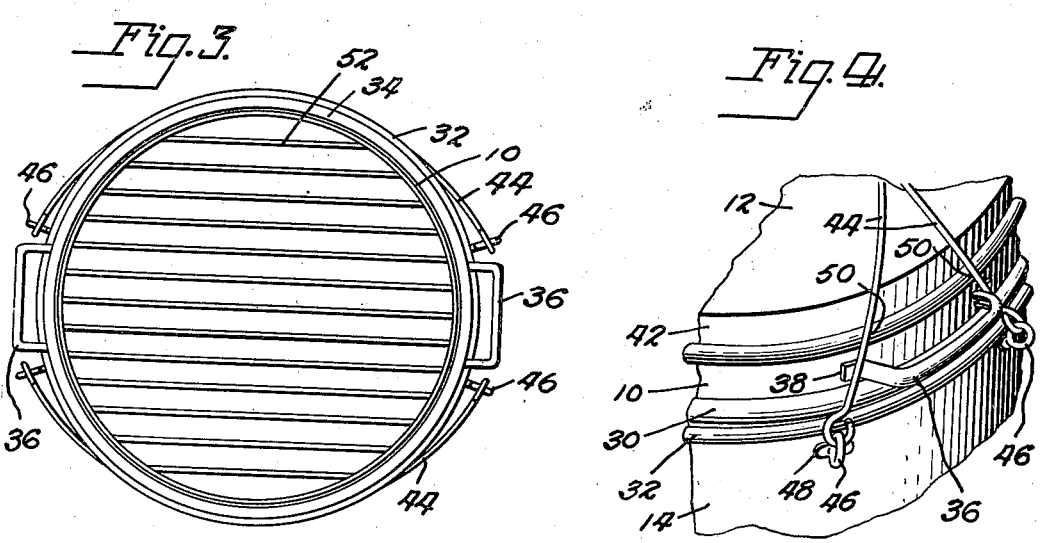
Robert N. Frank, Inventor
By Mason Fenwick & Lawrence, Attorneys Patented Oct. 3, 1939

2,174,824

UNITED STATES PATENT OFFICE 2,174,824

PORTABLE COOKER

Robert N. Frank, Milwaukee, Wis.

Application February 25, 1939, Serial No. 258,517

4 Claims. (Cl. 126—43)

This invention relates to cookers, and more particularly to portable cookers which are adapted to be carried about while still maintaining their contents in heated condition.

In the past, it has been desirable to have cooking devices in which food may be heated and moved from place to place while still keeping the food in a heated condition. It has been a common practice to cook food at one point in containers, and to carry it to a remote point at which place it is reheated for use. One of the objects of this invention is to avoid the need for reheating, by providing means for maintaining the food in a continuous heated condition.

Another object of the invention is to provide a portable cooker arranged to carry its own heating means.

A further object is to provide a cover construction which will preclude the cover from being easily knocked off of the cooker.

Yet another object is to arrange the handles of the cooking device so that they can cooperate with the cover to lock the same in place and avoid spilling the contents of the cooker.

Still another object is to provide a cooking utensil with a separable part which automatically provides proper air circulation for complete and efficient combustion.

Other objects and advantages of the invention will be ascertained from the following description, taken in connection with the accompanying drawing.

In the drawing, wherein like reference characters indicate corresponding parts in the various figures:

Figure 1 is a side elevation of the device in assembled relation;

Figure 2 is a cross-section of the device substantially on a line 2—2 of Figure 1;

Figure 3 is a top plan view showing the removable grill; and

Figure 4 is a partial perspective showing the cooperating relation between the handles, the cover, and the cooker.

Considering the drawing in greater detail, the device comprises a receptacle 10, a cover 12, and a base heating compartment 14.

The base is arranged with a substantially cylindrical center element 16 spot-welded at appropriate points 18 on the bottom of the heating compartment, to provide a means for retaining a heating medium such as the well-known so-called "canned heat" or Sterno. The side walls of the heating compartment are provided with one or more series of openings, with the openings located on opposite sides of a diameter, and different series at different elevations.

In Figure 1, a series of three openings 20 in one side wall of the container are shown substantially on a level with the top of the element 16, and with a second similar series 22 at the same elevation and at the opposite side. Similar series of openings 24 and 26 in the side walls are arranged above the first described series of air vents, and are positioned just below the base 28 of the cooking compartment 10 and disposed ninety degrees with respect to the other series of openings. By means of this arrangement, continuous air circulation through the heating compartment can be maintained so that complete combustion and efficient heating will always be maintained.

The cooker comprises a substantially cylindrical receptacle 10, having a side wall which is ribbed or beaded 30, so as to rest upon the rolled top 32 of the heating or base compartment. The upper edge 34 of the receptacle is beaded or rolled in a manner similar to the upper edge 32 of the base heating compartment.

Channel shaped handles 36 are preferably spot-welded at 38 to the receptacle, and are located on opposite sides of a diameter of the receptacle.

The cover 12 has a handle 40 of channel cross-section, which is also spot-welded to it. The cover is flat, having a relatively deep side wall 42 which fits snugly against the bead 34.

A pair of bails or handles 44 are fastened to eyes 46 spot-welded to the base member at spaced points, which are slightly off center of a diameter. The bails are so arranged and designed that they will firmly engage the cover in the vicinity of the points 50, thereby locking the cover firmly on the receptacle, whereby the device may be carried. Jolting then cannot spill the contents.

It is preferable to form the various parts of suitable metal, and in the preferred form an enamel coating may be placed entirely over the surface of the same, which may if desired, be of a dark or black color.

The cooker can be used with the removable grill 52 for steaming frankfurters, by placing water below the level of the grill. With the grill removed, other foods can be cooked. The device can also serve to demonstrate food products, such as canned foods.

The handles 36 may be arranged to be locked in position between the bails 44 when in position shown in Figure 1.

Although a preferred embodiment of the invention is illustrated and described, variations within the true spirit and scope of the same are to be determined by the appended claims.

What I claim is:

1. A portable cooker comprising an open top cylindrical base member, a receptacle adapted to nest within said base having a bead arranged to support it on the base, a plurality of spaced groups of apertures in the side wall of the bottom member, oppositely disposed groups of apertures adjacent the level of the bottom of the receptacle, and additional oppositely disposed groups of apertures positioned angularly and at a lower plane with respect to the first group of apertures.

2. A portable cooker comprising an open top cylindrical base member, a receptacle adapted to nest within said base having a bead arranged to support it on the base, spaced groups of apertures in the side wall of the base member adjacent the level of the bottom of the receptacle, additional spaced groups of apertures disposed angularly with respect to the first groups of apertures, a cover for said receptacle, and bails positioned at either side of a diameter of the base arranged when in upright position to lock the receptacle and cover to the base.

3. A cooker comprising separable elements, a cover adapted to fit upon the uppermost element, and bails secured to the lower element, said cover having a peripheral rolled edge arranged to surround the cooker, said bails when in upright position engaging the rolled edge of said cover, whereby to lock the same upon the cooker.

4. A cooker comprising a base member, a receptacle adapted to be supported in the base member, handles on said receptacle, a cover for said receptacle, and bails upon said base member adapted to engage said cover and handles to lock the cover, a receptacle and base together.

ROBERT N. FRANK.